UNITED STATES PATENT OFFICE.

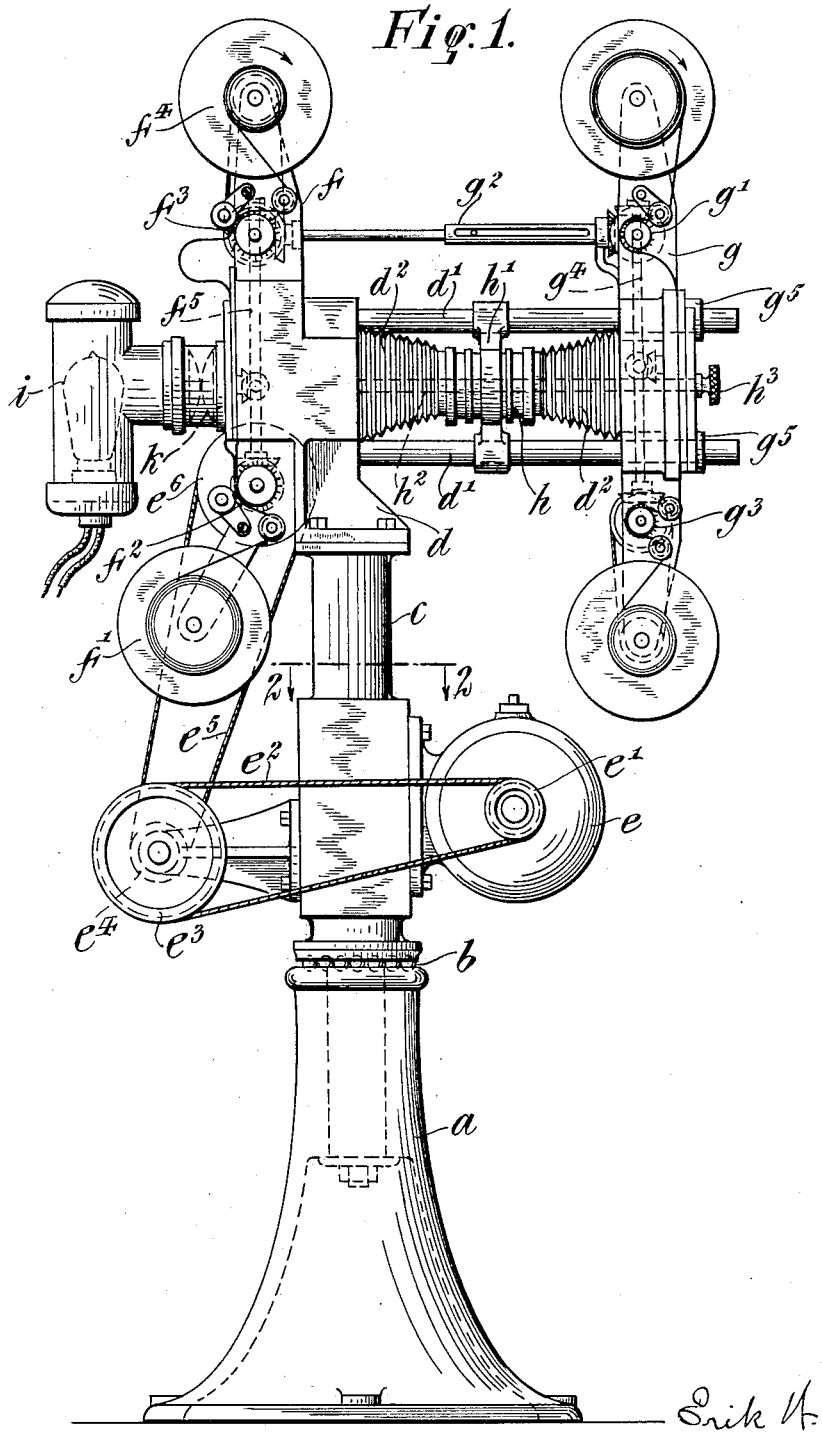

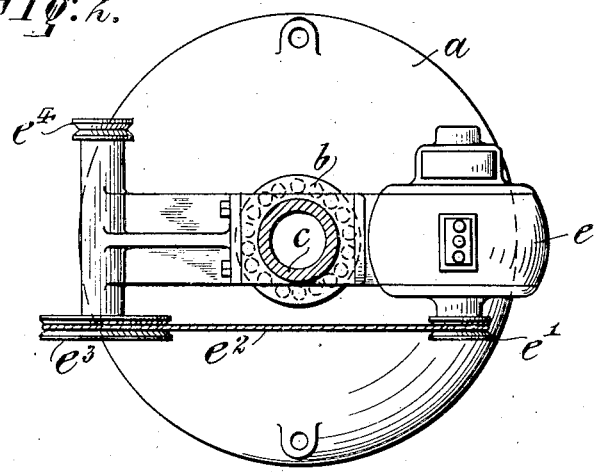
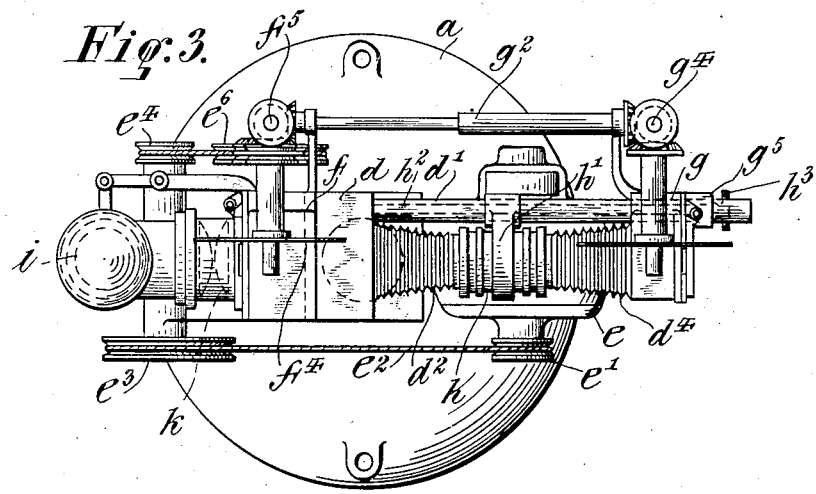
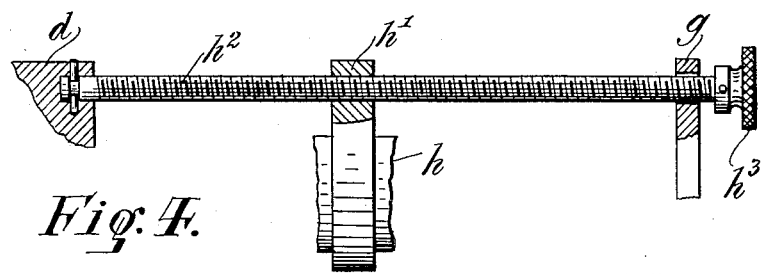

ERIK W. NELSON, OF NEW ROCHELLE, NEW YORK.

PHOTOGRAPHIC-FILM-PRINTING APPARATUS.

1,399,396.  Specification of Letters Patent.  Patented Dec. 6, 1921.

Application filed May 22, 1920. Serial No. 383,387.

*To all whom it may concern:*

Be it known that I, ERIK W. NELSON, a citizen of the United States, residing in the city of New Rochelle, in the State of New York, have invented certain new and useful Improvements in Photographic-Film-Printing Apparatus, of which the following is a specification, reference being had to the accompanying drawings, forming a part hereof.

This invention relates to apparatus for use in printing, either with the same size or with enlargement or with reduction, one moving picture film from another, either positive or negative. This operation is necessarily carried on in a room only dimly lighted by ruby light and under the constant supervision of an operator, who is required frequently to manipulate one film carrier or the other. Usually the several parts of the apparatus are fixed to a bench or table and the operator is required to move from one end of the apparatus to the other and sometimes to bend over the apparatus in order to get at some part on the remote side. It is the object of this invention to provide an apparatus for this general purpose which shall facilitate the work and thereby enable the production to be increased. In accordance with the invention the several parts of the apparatus are mounted upon a head which is supported on a base so as to be capable of rotation about a vertical axis, so that the operator, standing or sitting at one side, can readily rotate the head to bring one side or the other into position for convenient manipulation. The apparatus, moreover, is so constructed as to permit one of the film carriers to be adjusted readily with respect to the other, in order that the print may be enlarged or reduced as desired, and provision is also made for the convenient adjustment of the lens system. The invention will be more fully explained hereinafter with reference to the accompanying drawings in which it is illustrated, and in which Figure 1 is a view in elevation of the improved apparatus.

Fig. 2 is a view in section on the plane indicated by the broken line 2—2 of Fig. 1, looking down.

Fig. 3 is a top view.

Fig. 4 is a detail view of the lens adjusting means.

In the embodiment of the invention illustrated in the drawing a suitable base $a$, adapted to rest upon the floor, receives rotatably and with a suitable bearing, as at $b$, a stem or standard $c$, of suitable height, which forms a part of or has secured to its upper end a supporting head $d$ by which the film carriers, the lens system, and the source of light are supported. A suitable motor $e$, secured to the stem or standard $c$, drives through suitable pulleys and bands $e'$, $e^2$, $e^3$, $e^4$, $e^5$ and $e^6$, one of the feed drums of one of the film carriers, the other film carrier being driven from the first, as hereinafter described.

The term "film carrier" as herein employed, is to be understood to mean the ordinary devices by which the film, either original or printed, is made to move through the rays of light from the source of light, directed or focused by the lens system or systems. Such film carrier can be of any usual or suitable construction as to the film feeding devices and need not be shown or described in detail. The relatively fixed film carrier $f$, of the apparatus illustrated in the drawing, has a supply reel $f'$, a lower feed drum $f^2$, an upper feed drum $f^3$ and a take-up reel $f^4$, with the usual appurtenances, the lower feed drum $f^2$ being driven from the motor $e$ through the pulley $e^6$, while the upper feed drum $f^3$ is driven from the lower feed drum $f^2$ by a vertical shaft $f^5$, with suitable intermeshing bevel gears. The other, movable film carrier $g$ may be constructed in like manner, its upper feed drum $g'$ being driven from the upper feed drum $f^3$ of the film carrier $f$ through a telescoping shaft $g^2$ and suitable intermeshing bevel gears and the lower feed drum $g^3$ being driven from the upper feed drum $g'$ through a vertical shaft $g^4$, and suitable intermeshing bevel gears. By such means the film carrier $g$ is driven in synchronism with the film carrier $f$ while the extensible, telescoping shaft $g^2$ permits the position of the movable film carrier $g$ to be changed as desired.

The frame of the relatively fixed film carrier $f$ is applied directly to or forms a part of the supporting head $d$, while the frame of the relatively movable film carrier $g$ is mounted, with suitable bearings $g^5$, on horizontal rods $d'$ which are fixed in the head $d$, so that the film carrier $g$ can be moved toward or from the film carrier $f$ for the purpose of regulating the size of the print to be made on the sensitive film carried by the carrier $g$.

The lens system, or that part of the entire lens system which is located between the films, is sufficiently indicated by the tubular container $h$, supported by a frame $h'$ which is mounted on the rods $d'$, the tubular container being connected with the respective film carriers by the light-excluding bellows sections $d^2$. The frame $h'$ of the lens system has a threaded engagement with a screw $h^2$ which at one end is held rotatably but against longitudinal movement in the head $d$ and has at its other end a milled head $h^3$ by which the screw can be manipulated, the screw having a smooth bearing in the movable carrier $g$. By this means the lens system can be adjusted readily for purposes of focusing.

The source of light, indicated at $i$, is supported by the head $d$ with the usual primary lens $k$ being external to the two film carriers, that is, at one side of both, so that the rays of light shall pass through one film and fall upon the other.

It will be seen that the entire apparatus is constructed so as to hold the source of light, the lenses and the film carriers rigidly in line, while permitting easy movement of one of the film carriers with respect to the other and providing for synchronous operation of both films and for convenient adjustment of the intermediate lens system.

I claim as my invention:

1. A photographic film printing apparatus comprising a base, a supporting head mounted thereon and rotatable about a vertical axis, a horizontal bar extended from the head, a film carrier mounted on the head, a second film carrier mounted movably on said bar, a lens system supported by the head between the two film carriers and a source of light supported by the head external to the two film carriers.

2. A photographic film printing apparatus comprising a base, a supporting head mounted thereon and rotatable about a vertical axis, a horizontal bar extended from the head, a film carrier mounted on the head, a second film carrier mounted movably on said bar, a lens system supported by the head, means to operate the first carrier and transmission devices including a telescoping shaft, whereby the second carrier is operated from and in synchronism with the first carrier in all positions of the second carrier.

3. A photographic film printing apparatus comprising a supporting head, a film carrier supported by the head in relatively fixed position, a second film carrier supported by the head and movable toward and from the first carrier, a lens system and carrier therefor supported by the head and adjustable between the two film carriers, and an adjusting screw held at one end in said head rotatably but against endwise movement and having a smooth bearing in the second film carrier and having a threaded engagement with the lens carrier.

This specification signed this 21st day of May A. D. 1920.

ERIK W. NELSON.